United States Patent [19]
Matkin et al.

[11] 3,926,857
[45] Dec. 16, 1975

[54] ELECTRICALLY CONDUCTING MATERIAL CONTAINING SILICON CARBIDE IN A MATRIX OF SILICON NITRIDE

[75] Inventors: Derek Ivan Matkin, Wantage; Ian William Cavell, Harewell; John Raymond Dyson, Newbury, all of England

[73] Assignee: United Kingdom Atomic Energy Authority, London, England

[22] Filed: Dec. 13, 1974

[21] Appl. No.: 532,633

Related U.S. Application Data

[63] Continuation of Ser. No. 303,347, Nov. 3, 1972, abandoned.

[30] Foreign Application Priority Data

Nov. 8, 1971 United Kingdom............... 51878/71

[52] U.S. Cl. .................. 252/516; 252/504; 106/44
[51] Int. Cl.$^2$...................... H01B 1/02; H01C 1/02
[58] Field of Search .......... 252/518, 504, 506, 516; 106/44

[56] References Cited

UNITED STATES PATENTS

| | | | |
|---|---|---|---|
| 2,431,327 | 11/1947 | Geiger | 106/44 |
| 2,750,268 | 6/1956 | Erasmus et al. | 106/44 X |
| 2,752,268 | 6/1956 | Swentzel | 106/44 |
| 3,002,936 | 10/1961 | Allenbach et al. | 252/518 |
| 3,291,623 | 12/1966 | Saunders et al. | 106/44 X |

Primary Examiner—Benjamin R. Padgett
Assistant Examiner—Josephine Lloyd
Attorney, Agent, or Firm—Larson, Taylor and Hinds

[57] ABSTRACT

An electrically conducting material is produced by nitriding a mixture of silicon and a component capable of being converted to an electrically conducting phase under the conditions of the nitriding, thereby to produce a material comprising silicon nitride and the electrically conducting phase. The material produced has a low resistivity, which is retained over a wide temperature range.

3 Claims, No Drawings

ELECTRICALLY CONDUCTING MATERIAL CONTAINING SILICON CARBIDE IN A MATRIX OF SILICON NITRIDE

This is a continuation of application Ser. No. 303,347, filed Nov. 3, 1972, now abandoned.

This invention relates to an electrically conducting material and to a method of production thereof.

Silicon nitride has certain advantages as an engineering ceramic material. For example, it has high strength at elevated temperatures, it has a low coefficient of thermal expansion, it has low density, it can be machined when not fully sintered, and it suffers minimal shrinkage during sintering.

There are a number of methods for manufacturing ceramic artefacts including silicon nitride. See, for example, the specifications of our cognated U.K. Patent Applications Nos. 16047/68, 29296/68 and 50888/68 and the specification of our U.K. Patent Application No. 55145/70. The latter specification describes a method of making silicon nitride artefacts in which a mixture of silicon powder and unplasticised thermoplastic or thermosetting binder is shaped into an artefact by compression moulding at elevated temperature, and is subsequently heat treated in stages in which the binder is first removed to yield a green shaped artefact, which is subsequently sintered and nitrided. The electrical resistivity of such silicon nitride artefacts may be reduced by altering the nitriding process to leave un-nitrided silicon metal in the finished product.

In the specification of our U.K. Patent Application No. 32201/69, we have described and claimed a method whereby the electrical resistivity of silicon nitride artefacts may be further reduced. In this method, an electrically conducting material, such as graphite, is mixed with silicon powder prior to the curing and sintering of the green artefact. When the electrically conducting material is graphite, the final artefact will, of course, contain graphite. It will therefore only retain its low electrical resistivity at temperatures where the graphite does not tend to oxidise, i.e., at temperatures below about 300°C to 400°C.

According to this invention, a method for the production of an electrically conducting material comprises nitriding a mixture of silicon and a component capable of being converted to an electrically conducting phase under the conditions of the nitriding, thereby to produce a material comprising silicon nitride and the electrically conducting phase. Advantageously, the mixture is fabricated into an artefact before it is nitrided, so that the material produced will be in the form of the artefact. The techniques for fabricating artefacts are well known in the field of ceramic technology and will not be discussed further herein. It is highly desirable that the nitriding is carried out in an atmosphere in which oxidising gases are absent. Usually, the atmosphere comprises nitrogen alone, though it may comprise, for example, nitrogen and an inert gas such as argon.

We prefer that the component is carbon, when we particularly prefer that the relative proportions of the starting materials are selected so that free carbon is absent in the material produced, and the electrically conducting phase is silicon carbide. This is to enable the material to be used at temperatures as high as 900°C to 1,000°C in air whilst still retaining its low electrical resistivity. Also, we prefer to use the carbon in the form of particles which are as small as possible, for example, of a diameter not greater than $50\mu$. Thus, the carbon may be in the form of colloidal graphite, where the diameter of the particles is in the range from 100 A to 200 A, or it may be in the form of carbon fibres, having a mean diameter of $10\mu$.

A further example of a component which may be used is molybdenum when the electrically conducting phase is molybdenum disilicide.

The material produced by the present method has been found to possess a low resistivity and has applications over a wide range of temperatures. For example, resistivity values as low as 0.1 ohm cm have been obtained, when the material contains about 30 w/o of silicon carbide as the electrically conducting phase. The method has the outstanding advantage that the resistivity of the material can be controlled by varying the concentration of the component in the mixture and hence the concentration of the electrically conducting phase in the material. This is illustrated quantitatively in the examples of this specification.

According to a further aspect of the invention, there is provided an electrically conducting material comprising an interconnecting network of an electrically conducting phase in a matrix of silicon nitride. Preferably, the material is in the form of an artefact.

The invention will now be illustrated by the following examples.

EXAMPLE 1

A mixture of fine silicon powder of particle size $15\mu$ (85 w/o) and colloidal graphite of particle size between 100 A and 200 A (15 w/o) was prepared. The mixture (1 kg) was mixed with methyl ethyl ketone (1 l) in which polyvinylbutyral (200 g) had been dissolved. The methyl ethyl ketone was evaporated and the resultant material crushed into granules of less than $150\mu$ diameter. The granules were loaded into a metal die and plunger and warm moulded at a pressure of up to 2 tsi and a temperature of 100°C. The warm moulded material was removed from the die and heated in vacuo to 500°C at a rate of 10°C/hour to remove the polyvinylbutyral. It was then further heated in an atmosphere of flowing nitrogen to produce a mixture of silicon nitride and silicon carbide with no unreacted graphite or silicon according to the following schedule:

| Temperature | Heating Rate (if appropriate) | Further Conditions (if appropriate) |
| --- | --- | --- |
| 1300°C | — | Held for 15 hours to form some $Si_3N_4$ and SiC |
| 1300°C to 1350°C | 100°C/hr | — |
| 1350°C | — | Held for 20 hours to complete formation of SiC |
| 1350°C to 1450°C | 100°C/hr | — |
| 1450°C | — | Held for 20 hours to complete formation of $Si_3N_4$ |

X-ray analysis of the resulting material showed that its approximate composition was 37 w/o $\beta$-SiC, 29 w/o $\alpha$-$Si_3N_4$, 34 w/o $\beta$-$Si_3N_4$.

The resulting material was found to have a resistivity of 2.5 ohm cm at room temperature and could be heated up to 600°C in air for 2 months with little change in room temperature resistivity. It could also be heated up to 800°C in pure argon for a similar period with little change in room temperature resistivity.

As an alternative, carbon fibres of mean diameter 10μ may be substituted for the colloidal graphite.

The procedure described in Example 1 was repeated employing different concentrations of carbon in the starting mixture. The volume percentage of SiC of the product and the resistivity thereof were determined in each case and the results are summarised below (Examples 2 to 9).

| Example | w/o carbon in mixture | v/o SiC of product | Resistivity of product (ohm-cm) |
| --- | --- | --- | --- |
| 2 | 0 | 0 | $10^{11}$ |
| 3 | 10 | 16 | 140 |
| 4 | 11 | 18 | 60 |
| 5 | 12 | 20 | 27 |
| 6 | 13 | 25 | 13 |
| 7 | 14 | 28 | 7 |
| 8 | 15 | 28.5 | 5 |
| 9 | 20 | 29.5 | 2.5 |

The results obtained in Examples 1 to 9 clearly show that the resistivity of the product can be controlled by varying the concentration of carbon in the mixture.

EXAMPLE 10

A mixture of silicon powder of particle size 15μ (80 w/o) and fine molybdenum powder (20 w/o) of particle size 10μ was prepared. The mixture (1 kg) was mixed with methyl ethyl ketone (1 l) in which polyvinylbutyral (200 g) had been dissolved. The methyl ethyl ketone was evaporated and the resultant material crushed into granules of less than 150μ diameter. The granules were loaded into a metal die and plunger and warm moulded at a pressure of up to 2 tsi and a temperature of 100°C. The warm moulded material was removed from the die and heated in vacuo to 500°C at a rate of 10°C/hour to remove the polyvinylbutyral. It was then further heated in an atmosphere of flowing nitrogen to produce a mixture of silicon nitride and molybdenum disilicide with no unreacted molybdenum or silicon according to the following schedule:

| Temperature | Heating Rate (if appropriate) | Further Conditions (if appropriate) |
| --- | --- | --- |
| 1300°C | — | Held for 15 hours to form some $Si_3N_4$ and $MoSi_2$ |
| 1300°C to 1350°C | 100°C/hr | — |
| 1350°C | — | Held for 20 hours to complete formation of $MoSi_2$ |
| 1350°C to 1450°C | 100°C/hr | — |
| 1450°C | — | Held for 20 hours to complete formation of $Si_3N_4$ |

X-ray analysis of the resulting material showed that its approximate composition was 30 w/o $MoSi_2$, 40 w/o 0-$Si_3N_4$, 35 w/o β-$Si_3N_4$.

We claim:

1. An electrically conducting material having a resistivity of not greater than 140 ohm-cm and comprising an electrically conducting network of silicon carbide in a matrix of silicon nitride, wherein the proportion of silicon carbide in the material is not greater than 37 percent by weight.

2. A method of producing a silicon nitride ceramic artefact having reduced electrical resistivity which comprises forming a mixture of carbon particles having a particle size of not greater than 50 microns and silicon particles and subjecting the mixture to nitriding conditions to nitride the silicon under which conditions the silicon and carbon react to form an electrically conductive interconnecting network silicon carbide phase in a matrix of silicon nitride, the relative proportions of silicon and carbon in the mixture and the conditions of nitriding being such that free silicon and free carbon are absent in the silicon nitride ceramic artefact, said silicon nitride artefact having an electrical resistivity not greater than 140 ohm-cm and having a silicon carbide content not greater than 37 percent by weight.

3. A method according to claim 2 wherein the carbon is in the form of colloidal graphite.

* * * * *